United States Patent [19]

Lawrence

[11] 4,366,644

[45] * Jan. 4, 1983

[54] METHOD AND APPARATUS FOR TERMITE CONTROL

[75] Inventor: Lucas G. Lawrence, San Bernardino, Calif.

[73] Assignee: Daniel J. Bondy, Sherman Oaks, Calif.

[*] Notice: The portion of the term of this patent subsequent to Sep. 23, 1997, has been disclaimed.

[21] Appl. No.: 188,886

[22] Filed: Sep. 19, 1980

Related U.S. Application Data

[63] Continuation-in-part of Ser. No. 902,949, May 5, 1978, Pat. No. 4,223,468.

[51] Int. Cl.³ .............................................. A01M 3/00
[52] U.S. Cl. ................................................. 43/132 R
[58] Field of Search ............... 43/112, 124, 132 R, 43/98; 47/1.3; 250/492 B; 325/102, 111, 118, 119

[56] References Cited

U.S. PATENT DOCUMENTS

| | | | |
|---|---|---|---|
| 855,588 | 6/1907 | Prudden | 43/98 X |
| 3,258,872 | 7/1966 | Senkewich | 43/112 X |
| 3,820,279 | 6/1974 | Sieper | 47/1.3 |
| 3,879,702 | 4/1975 | Mancone | 43/124 |
| 3,971,292 | 7/1976 | Paniagua | 43/112 X |
| 3,973,354 | 8/1976 | Schommer | 47/1.3 |
| 4,223,468 | 9/1980 | Lawrence | 43/132 R |

FOREIGN PATENT DOCUMENTS 2731905  1/1979  Fed. Rep. of Germany ... 43/112 X

Primary Examiner—Nicholas P. Godici
Assistant Examiner—Charles L. Willis
Attorney, Agent, or Firm—Christie, Parker & Hale

[57] ABSTRACT

An apparatus and method for controlling pests, particularly termites. The method involves the application of broad band radio frequency or multifrequency high-voltage electrical energy to termite shelter tubes, galleries and nests and to the bodies of the termites themselves. Killing of termites is accomplished directly by electroshock and indirectly by interference with the digestive processes of the termites. The apparatus is a probe gun incorporating circuitry for generating an electric signal having a voltage in the 100,000 volt range and a frequency range of 0-500 KHz.

20 Claims, 7 Drawing Figures

METHOD AND APPARATUS FOR TERMITE CONTROL

CROSS REFERENCE TO RELATED APPLICATION

This is a continuation-in-part application of Ser. No. 902,949, filed May 5, 1978, now U.S. Pat. No. 4,223,468 by Lucas George Lawrence, entitled "Method and Apparatus for Termite Control", which is hereby incorporated herein by reference.

DESCRIPTION OF THE PRIOR ART

The present invention relates to the control of pests, particularly social insects such as termites and fire ants and, in particular, relates to the control of termites by the application of electric currents.

The current methodology for control of pests such as termites and fire ants has involved the use of dangerous pesticides and chemicals of a poisonous nature applied to the infested structure. The application of such pesticides and poisons constitutes an inconvenience and a hazard from a number of different points of view. In the first instance, in the usual case, the application of pesticides requires evacuation of the structure to be fumigated and the removal of food and other consumable products to prevent their being contaminated by the application of the pesticide. More importantly, the use of pesticides presents an environmental hazard in terms of the residuum left after their use. As in the case of pesticides used in agricultural applications, termite pesticides pose a lingering hazard by being leached into soil and streams where they can later be a threat to plant and animal life.

Other methods for control of pests such as termites and fire ants require the application of extremely high energies to the infested structure. See A. M. Senkewich, U.S. Pat. No. 3,258,872. The extremely high energy levels, up to several thousand watts, present serious dangers to operators and structures being treated. Moreover, these methods require heavy, cumbersome equipment together with multiple operators, high labor costs, and a source of power that normally cannot be provided by the average home (1500 watts and more). These brute force methods do not take into account the unique social living patterns and vulnerabilities of wood-infesting insects.

SUMMARY OF THE PRESENT INVENTION

The present invention provides a method for controlling and eliminating termites and wood-infesting social insects by applying electrical voltage to termite infested areas.

In another aspect, the invention provides an apparatus for applying electric energy to pest-infested structures. The apparatus comprises a portable housing and a source of electric energy. To the source of energy is connected means for generating a high voltage radio frequency signal located within the housing. An output electrode is connected to the generating means and extends from the housing. The electrode is disposed so as to deliver high-voltage radio frequency electrical energy to the infested structure.

In another embodiment, means for generating high voltage multifrequency power is provided within the housing. In this version, the electrode is disposed so as to deliver high-voltage multifrequency electrical energy at safe power levels to the infested structure.

The method of the present invention is accomplished utilizing several specific means. The first is the use of a portable gun whereby a high-voltage radio frequency electric signal is directly contacted to termite-infested woodwork. The moisture characteristic of the tubes, galleries, nests and bodies of termites provide a sufficiently good conductive path to overcome the insulating properties of wood which the termites normally infest and transmit the electric energy to the termites. Those termites near the point of energy application are killed instantly and those located more distantly are eliminated by virtue of the effect of electricity on digestive processes and on feeding of the non-foraging elements of a pest colony.

A second specific means is the use of a portable gun whereby high-voltage multifrequency electric energy is directly contacted to termite infested woodwork. The natural habitat of termites are galleries bored into wood, and, because of metabolic, feeding and digestive processes, said galleries become moist and enriched with a carbon dioxide atmosphere. Entomologists have established that subterranean termites live in an environment containing up to fifty times the concentration of $CO_2$ present in our atmosphere. Nevertheless, the generic electrical resistance of wood is relatively high. To improve transmission of electric power through it, ionizing high-voltage, multifrequency power is used. The multifrequency electric gun is capable of overcoming the generic resistance of wood, which improves extermination of social pests. Nevertheless, we have discovered that significantly lower power levels can be advantageously employed if the high-voltage multifrequency energy is injected directly into the galleries. The conductance of the galleries is higher than that of the surrounding non-infested wood, and the killing effect of the electrical energy is greatly magnified.

Additionally, the injected electricity can be focused into specific areas within a gallery system, as exist in infested homes, by using "natural" conductors such as nails as energy-return points of energy injectors. Nails can be electrically grounded by means of wires connected to a true earth ground (such as a water pipe, etc), with small magnets providing ready contact.

The principle of current enhancement by use of high voltage multifrequency energy, calculated to deliver maximum electrical kill-energy at low power levels, to woodboring social insects is exploited. Those termites near the point of energy application are killed instantly. Those more distant are eliminated by virtue of the effect of electrical energy on digestive processes and on feeding of the non-foraging elements of a social pest colony.

Termites are located by conventional methods, such as locating deposits of ejected excrements, physically probing suspected areas of infestation and using acoustical methods. Energy can be applied at any point along the galleries and tubes or directly into the nest. Once the nest is located, an electrode is injected into it and the pests are eliminated by applying either the high-voltage radio frequency energy or the high-voltage multifrequency electric energy directly to the electrode. Application of electricity to the nest has the effect of killing the queen termite, causing the colony to cease foraging and to die out.

The proper magnitude of electric treatment power is monitored by the operator by the use of accessories having visual indicators such as meters or incandescent lights. Also utilized with the probe gun and associated circuitry of the present invention is a dynamic conductance-test circuit, which, by means of a calibrated or standard test specimen such as wood, permits the setting of proper power levels for the probe gun with regard to expected treatment conditions.

DESCRIPTION OF THE DRAWINGS

These and other advantages of the invention will be better understood by reference to the drawings wherein.

DESCRIPTION OF A SPECIFIC EMBODIMENT

Figure 1:
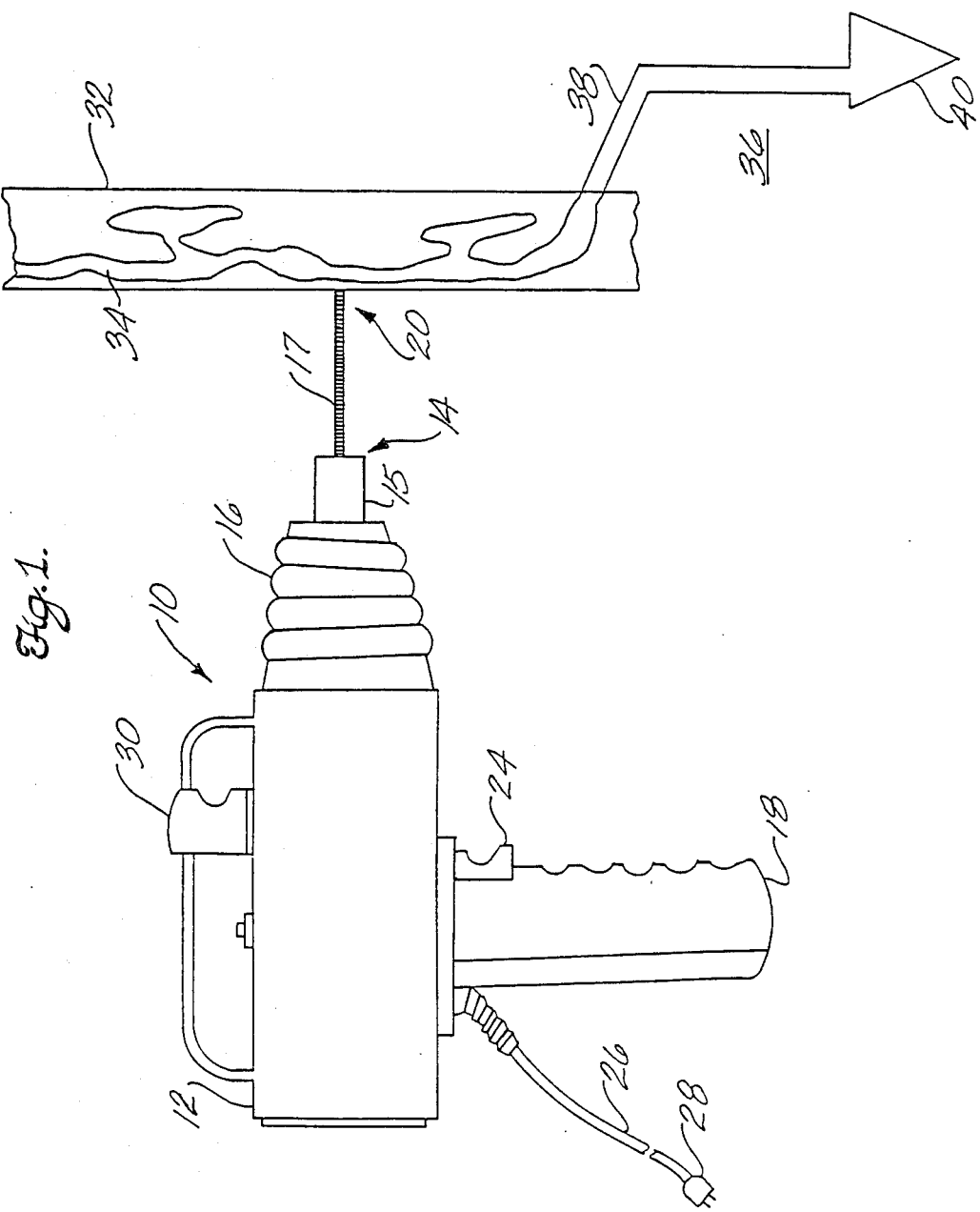
FIG. 1 is an elevation view of a hand-operated gun for application of electrical energy to a pest-infested locality.

As shown in FIG. 1, the apparatus and method of the present invention utilizes a gun or apparatus 10 in the form of a hand-tool having a housing 12 containing the electrical circuitry for generating a multifrequency or radio frequency high-voltage discharge. A discharge tip 14 is mounted on an insulator 16 at the front of the gun. Tip 14 has a base 15 mounted in a conductive receptacle located at the front of insulator 16 which also contains an electrical safety gap. A flexible probe 17 extends from base 15. The probe tip is preferably spring-loaded. A hand grip 18 is utilized by the operator to direct the gun at the area 20 to which a high-voltage radio frequency or multifrequency electric energy signal is to be applied by operation of trigger 24 on the gun. Conventional electric line power is supplied to the gun by means of conductor 26 which terminates in a conventional plug 28 for connection to a normal A.C. outlet. A light 30 is provided at the top of the gun to provide illumination directed at the area to which the probe 17 is to be contacted. The spring-loaded tip facilitates contact with the surfaces of the areas to be treated. In the preferred practice of the method, the probe is directly contacted to the area to be treated. The gun is then moved in a predetermined pattern such as a back-and-forth sweeping motion over the surface.

In FIG. 1, a section of termite-infested wood 32 is shown, in which are located termite galleries 34, extending through the wood 32 and thence into the ground 36 through shelter tubes 38 to a termite nest 40 located in moist ground beneath the structure. The galleries, tubes and nests are characterized by a conductive moisture secreted by the termites as they pass through the various passages which are conductive. On application of a high-voltage radio frequency current, or a high-voltage multifrequency current, the electric current is conducted by this moisture through the galleries and tubes and other moist biomass, including termites themselves and their feces and detritus, producing extermination in one of several ways.

In the first instance, the termites near the point of probe 17 are subjected to a sufficiently high level of electric current and are killed immediately by electroshock. If the subjection of the termite-infested area and the termites to an electric current is not sufficient to kill the termites, by electroshock because of their relative remoteness from the point of contact, the electric currents are still sufficient to disrupt their biological processes, ultimately resulting in their extermination or starvation.

In this latter situation, the subjection to electric current interferes with the digestive processes of the worker termites, preventing proper digestion and causing the termites to starve. The electric currents are believed to inhibit the action of bacteria or protozoans in converting cellulose into sugar and enzymes in the digestive systems of the foraging elements of the termite colony. The interference with the digestive processes of the foraging termites also means that the feeding of the nonforaging elements of the colony becomes impossible and, thus, the entire colony either starves out or is decimated by natural predators due to the defensive incapability of the termite colony.

Figure 2:
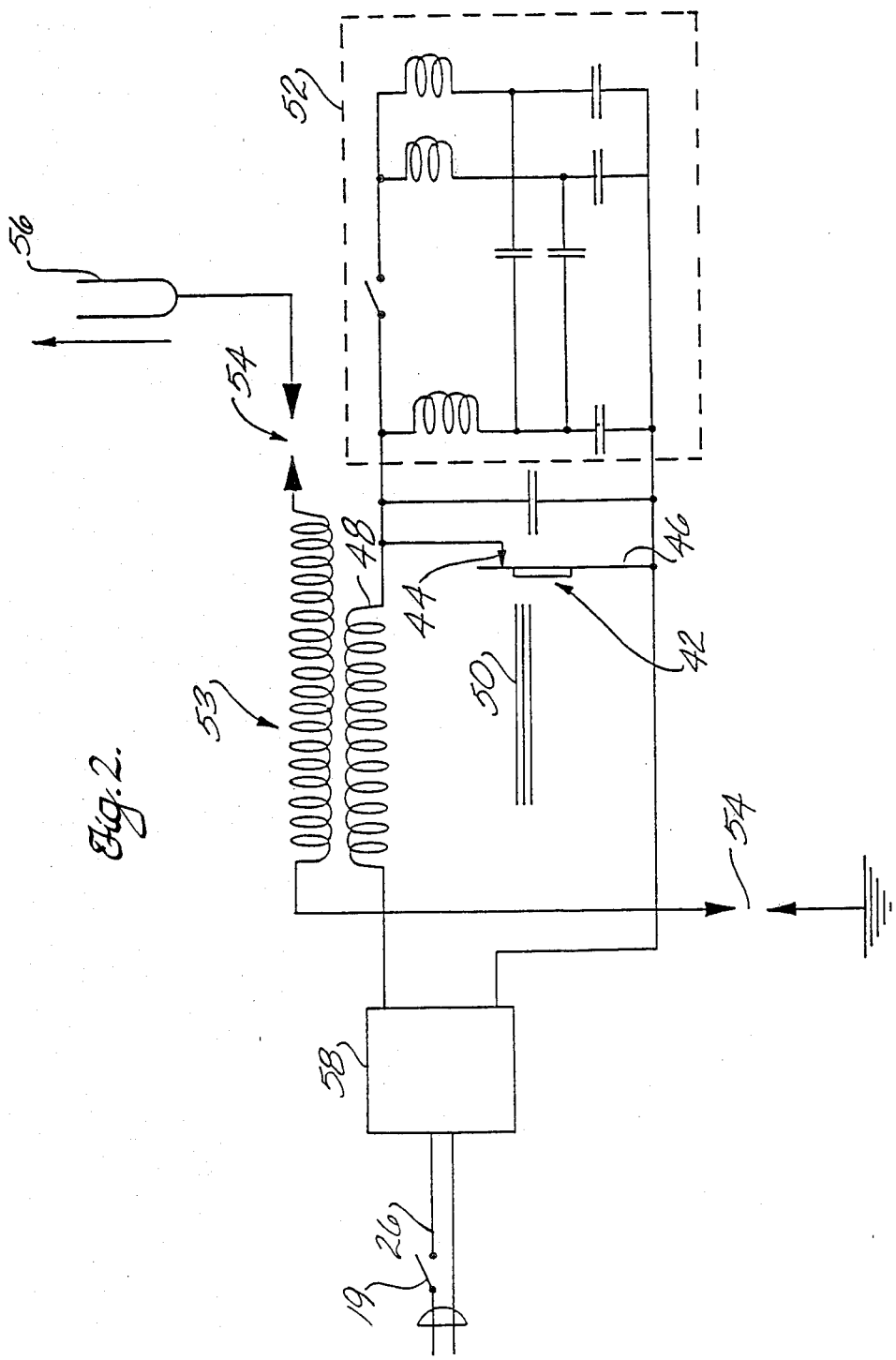
FIG. 2 is a schematic diagram of the electric circuitry utilized in the gun of FIG. 1.

One embodiment of the electric circuitry of the gun 10 of FIG. 1 is shown in FIG. 2. As shown therein, the circuitry includes a vibrator 42 having a contact 44 and an armature 46. Armature 46 is electrically connected in series with a coil 48. When electric energy is supplied to coil 48 by the closing of switch 19, armature 46 is attracted to core 50 of inductor 48 which acts as an electromagnet and the point of contact between the armature and contact 44 opens. This opens the circuit supplying energy to the inductor 48 and causes the armature of the vibrator, which is spring-biased, to close contact again with contact 44. As long as energy is applied to the coil, the opening and closing action of the vibrator-operated inductor continues. Inductor 48 is also the primary winding of an output transformer 53 which supplies high-voltage radio frequency energy to the output electrode.

An LC resonator 52 is connected in parallel circuit relationship with the vibrator-operated inductor 48 and acts as a tank circuit to provide a spectrum of frequencies which modulate the vibrator-produced signal. By virtue of a very high secondary-to-primary turns ratio, a very high voltage signal, on the order of 50,000 to 100,000 volts at a current level of approximately 500 microamperes is induced in the secondary winding and transmitted by a safety spark gap 54 to output electrode 56. The spark gaps 54 prevent line power from being transmitted through gun 10 while providing a low impedance path to the high-voltage frequency RF signal. The result is a high-voltage radio frequency signal which has a broad spectrum of fundamental and harmonic frequencies in the range of 60 Hz to 500 kHz, which is discharged in pulses or bursts from the electrode 56 to the termite-infested area.

An RF filter 58 is connected between the circuitry of the electron gun and the line 26 transmitting conventional line power to the gun. Filter 58 prevents radio frequency interference from the gun circuitry from being transmitted back to the power line 26 and causing interference in the operation of radios and T.V.'s on the same line.

Figure 3:
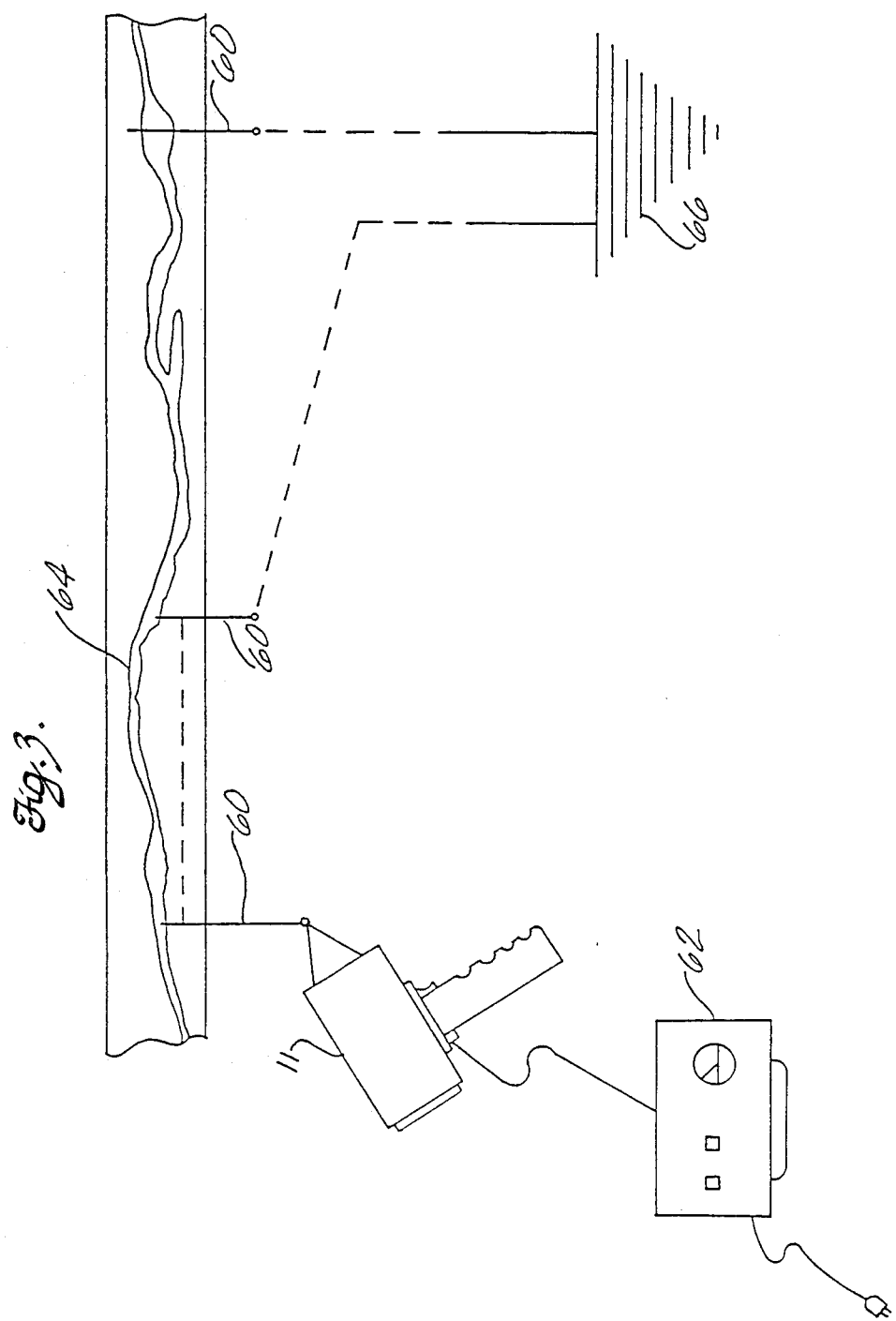
FIG. 3 is a diagrammatic illustration of the use of the apparatus of FIG. 1 in an alternate embodiment of the invention having particular application to drywood termites.

The apparatus illustrated in FIG. 1 is particularly useful for controlling subterranean termites which nest and move between the moisture-containing ground and the wood-containing materials on which the termites feed. The present invention is also applicable to use with drywood termites and powder-post beetles. Because such species do not migrate into the subsoil to acquire moisture and, thus, do not establish electrically-conductive paths, a plurality of auxiliary electrodes 60 are driven through the wood and into the termite galleries as shown in FIG. 3. Alternatively, the conductivity of the galleries is enhanced by introducing a conductive fluid therein. The point of application of the conductive fluid is one of the points of entry into the termite-infested area.

Figure 4:
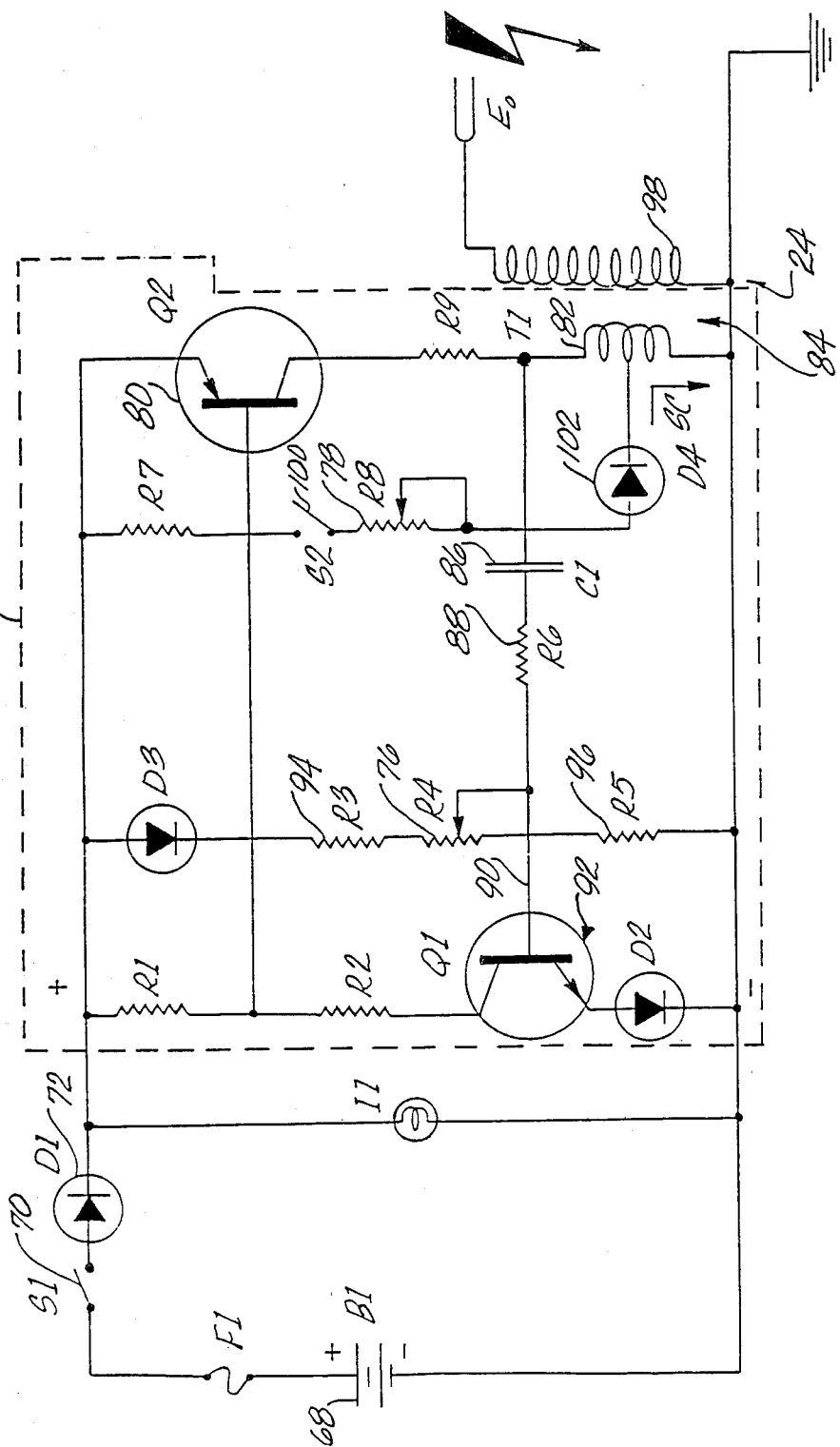
FIG. 4 is a schematic diagram of an alternate embodiment of the circuit of FIG. 2.
Figure 5:
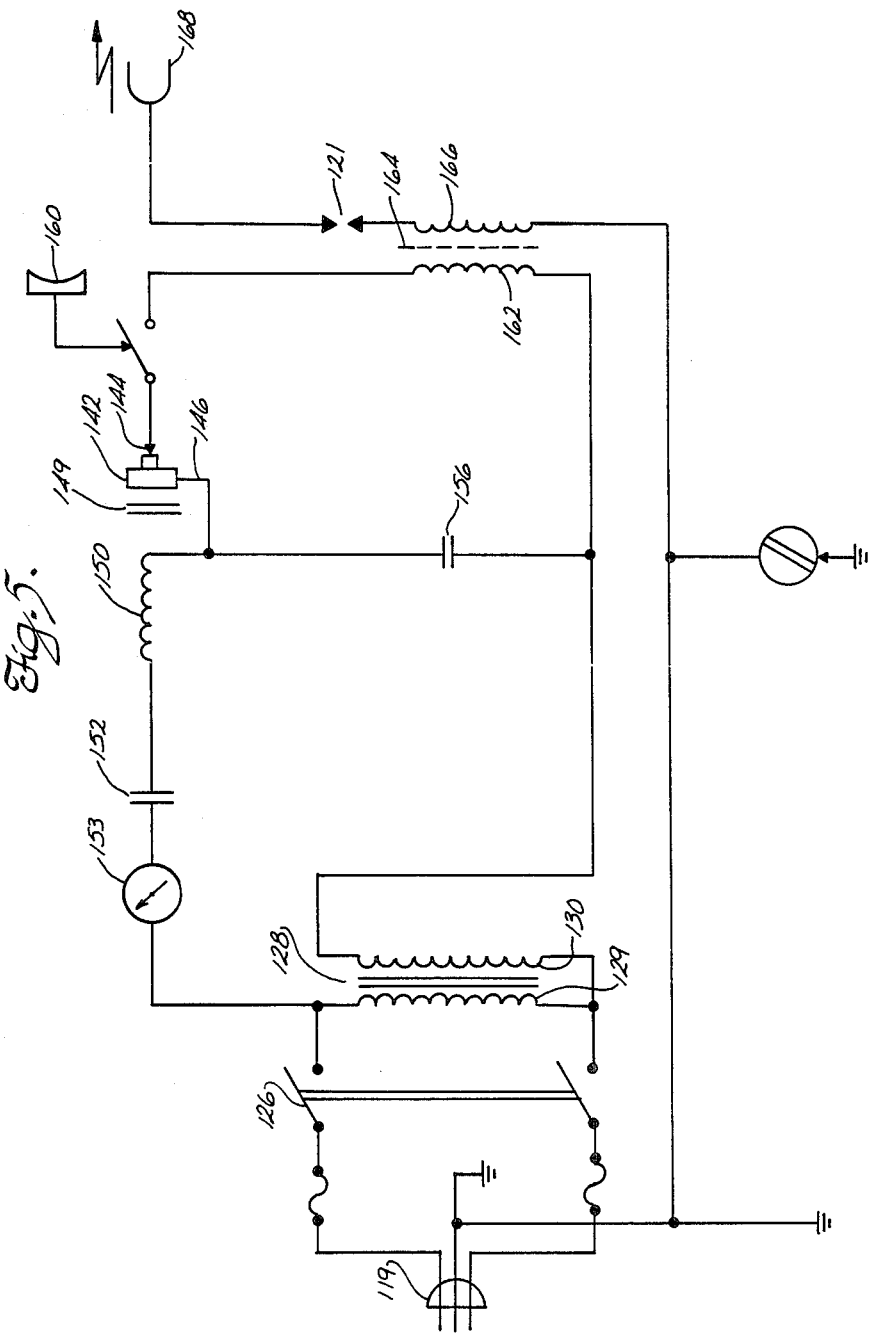
FIG. 5 is a schematic diagram of an alternate embodiment of the electric circuitry utilized in the gun of FIG. 1.

A gun 11 is then brought into contact with one of the electrodes and energized by supplying power thereto from a power supply 62 constructed according to the principles of the present invention such as is shown in FIGS. 2, 4 and 5. A zero inductance cable 13 interconnects gun 11 and the radio frequency or multifrequency power system 62. A suitable cable for this application is a cable having parallel wires without any intertwining whatever to eliminate radio frequency losses. Such a cable is used whenever the gun and power supply are physically separated. The point of application of the conductive fluid is a point of entry into the termite-infested area. The high-voltage energy is conducted by the slightly-conductive termite galleries and other conductive paths to the other auxiliary electrodes 60 which are grounded to complete the circuit. Current flows through the galleries 64 and thence to ground 66. The energy supplied by gun 11 is, again, either a high-voltage radio frequency signal or a high-voltage multifrequency signal, the generation of which is discussed in connection with FIG. 5. Upon encountering the termites and termite nests, the effect in terms of producing death of the termites by electroshock or by interference with the digestive processes causing starvation and weakening of the colony is again the result.

In addition to the vibrator-operated inductor of FIG. 2, high-voltage radio frequency energy is also provided in an alternate embodiment by means of the oscillator circuit illustrated in FIG. 4. As shown therein, the oscillator comprises a D-C power supply 68 connected by means of an operating switch 70 through a blocking diode 72 to an oscillator circuit 74. Oscillator 74 is a feedback-relaxation type of oscillator. Frequency adjustment is accomplished by means of potentiometer 76 and voltage intensity adjustment is accomplished by potentiometer 78. The oscillator output is provided by a power transistor 80 which is a power transistor connected in a common emitter configuration. The timing of the oscillator is a function of the saturation of the primary winding 82 of transformer 84. The timing pulse is transmitted via capacitor 86 and resistor 88 to the base electrode 90 of transistor 92. The time constant of capacitor 86, together with resistors 94, 76, 96 and 88, determine the effective length of the oscillator's timing cycle. A voltage is induced in winding 82 and, by virtue of the turns ratio stepped up to a very high voltage in secondary winding 98 to provide an output voltage of approximately 100,000 volts. The frequency band of the output signal is 60 Hz to 600 kilohertz, again in the microampere range. By adjusting the "Q" of the transformer, by means of potentiometer 78, frequency and voltage intensity adjustments can be obtained.

The power supply system of an alternate embodiment of the gun 10 of FIG. 1, providing high-voltage multifrequency electric energy, is shown in FIG. 5. Electric current is drawn from a typical AC power line by means of plug 119 and, via switch 126, is fed into power-boost transformer 128. This transformer is preferably phase additive so that an electric potential of 20 volts is developed across secondary winding 130, the 120 volt AC line voltage entering primary winding 129. The boosted line voltage is then transmitted through ampere meter 153 and resonating circuit components 152 and 150 to vibrator 142. The resonating components preferably comprise a capacitor 152 and an iron core inductor 150, respectively. The values of the capacitor and inductor are chosen to have substantially zero reactance at circuit resonance. The ohmic resistance of the inductor 150 thus governs the magnitude of current flow through the electrical circuit. This resistance and the inductance of element 150 is sufficient to protect transformer 128 when switch 146 is open. In a preferred embodiment, the capacitance of element 152 is about 13 microfarads and the inductance of element 150 is about 0.5 henrys, with an ohmic resistance of about 45 ohms.

The vibrator 142 has a contact 144 and an armature 146. Armature 146 is electrically connected in series with coil 150. A coil 162, the primary winding of an output transformer 164, is connected in series with a switch 160 and contact 144 of the vibrator and in parallel circuit relationship with a capacitor 156.

A pushbutton 161 is linked to switch 160 to manually operate the switch when energy is to be applied to a termite infested site. Pushbutton 161 is preferably mounted in a handgun (not shown).

The multifrequency energy generation process commences when the operator depresses pushbutton 161 and closes switch 160. The armature 146 is normally spring-biased into electrical contact with contact 144. When electric energy is supplied to coil 150 by the closing of the gun switch 160 armature 146 is attracted to core 149 of inductor 150 which acts as an electromagnet and the point of contact between the armature 146 and contact 144 opens. This causes the capacitor 152 and inductor 150 to resonate in a series circuit relation and an emphatic high-voltage spike is produced which charges capacitor 156. The opening of the vibrator also causes an arc to form between armature 146 and contact 144. The high-voltage energy stored in capacitor 156 is discharged under arc action through contact 144 into coil 162, and the vibrator closes. This process repeats itself as long as energy is supplied to coil 150 and the gun switch 160 is depressed.

Coil 162 and capacitor 156 resonate at their natural frequency, which is determined by the values of the inductance of coil 162 and the capacitance of element 156. In a preferred embodiment, these values were chosen at about 11 microhenrys and 0.1 microfarads, respectively, for a natural resonant frequency of about 150 kHz with very strong side bands. The time intervals when vibrator 142 is open are about 2 milliseconds long, while capacitor 156 has a charge time of about 30 microseconds and a discharge time of about 6 microseconds. In a typical cycle of AC voltage, the 2 millisecond opening of the vibrator occurs at a phase angle of about 110° from the origin and half a cycle later at about 290° (or −70°) from the origin. The circuit shown in FIG. 5 allows capacitor 156 to be charged to a value of approximately 2000 volts.

Coil 162 serves as the primary winding of a gun transformer 164 having secondary winding 166. Output transformer 164 is connected between the circuitry that generates the multifrequency signal and an output electrode 168 permits the energy to exit. Preferably the output electrode and the output transformer are closely spaced to reduce energy losses therebetween to a minimum. A very high secondary-to-primary turns ratio between winding 166 and winding 162 of the gun transformer is chosen so that a very high voltage signal, on the order of 50,000 to 100,000 volts at a current level of approximately 500 microamperes, is induced in the secondary winding and transmitted by a safety spark gap 121 to output electrode 168. Preferably, the voltage at the output electrode is about 75 kilovolts.

The high electrical impedance of safety gap 121 prevents direct short circuit connection of power line voltages such as 120 V to the secondary coil 166 to prevent damage to the probe in the event the gun probe 17 accidentally contacts electrical wiring in the structure being treated.

Figure 6:
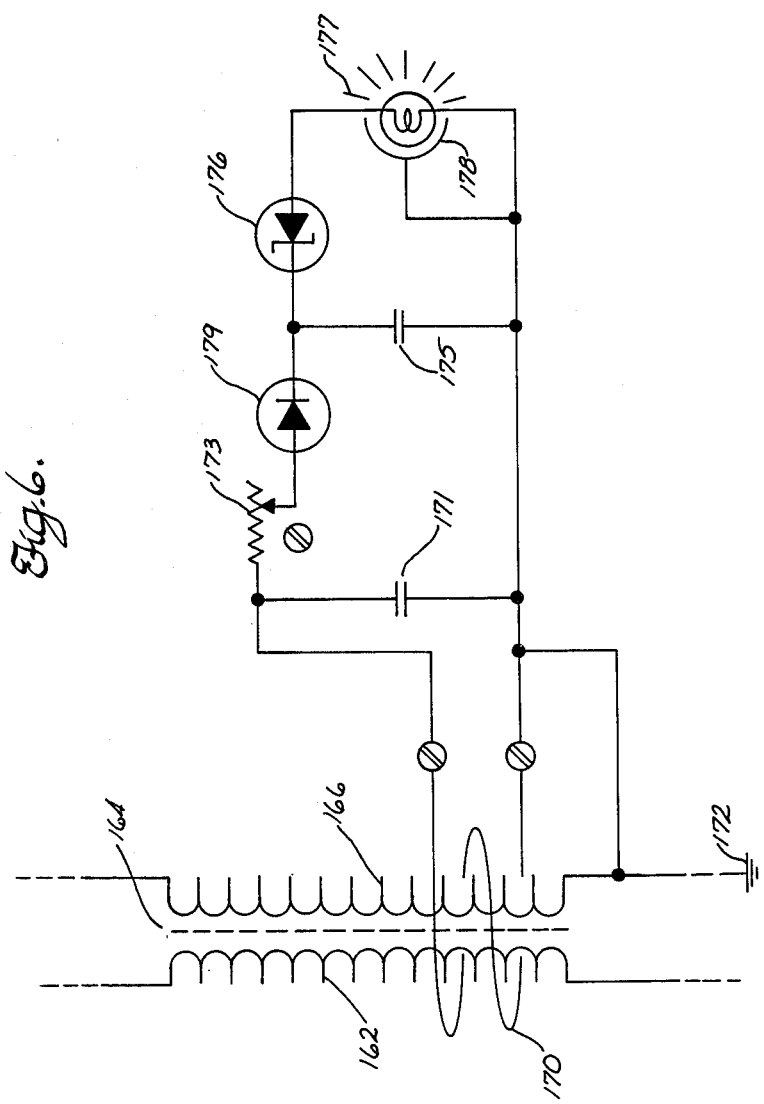
FIG. 6 is a schematic diagram of a visual power-output monitor utilized with the gun of the present invention.

FIG. 6 shows the circuit of a visual power-output monitor using an incandescent lamp 177 which is incorporated into the circuitry of the power system for the present invention. To energize the composite monitoring circuit, a tertiary winding 170 is wound over the primary 162 and secondary 166 coils of transformer 164 shown previously in FIG. 5. Tertiary coil 170 is situated at ground potential 172 to eliminate flash-overs. The current of winding 170 is smoothened by capacitor 171, passed through the calibrated rheostat 173, rectified by diode 174, filtered by capacitor 175 and, finally, via Zener diode 176, fed into the indicator lamp 177. The Faraday shield 178 behind lamp 177 is a safeguard against shock hazards. It is a specific duty of Zener diode 176 to energize, by virtue of the knee-shaped characteristic curve of the Zener diode, lamp 177 only then when a flux field of sufficient strength prevails in, and is electrically passed on by, transformer 164. Energization of lamp 177 provides positive indication to the operator that the desired termite killing power levels are being provided to the area to be treated. When the lamp is extinguished, the operator either increases the level of power being supplied to energize the lamp or interrupts the operation of the system to determine if a problem situation has been encountered, such as a power line supply problem.

Figure 7:
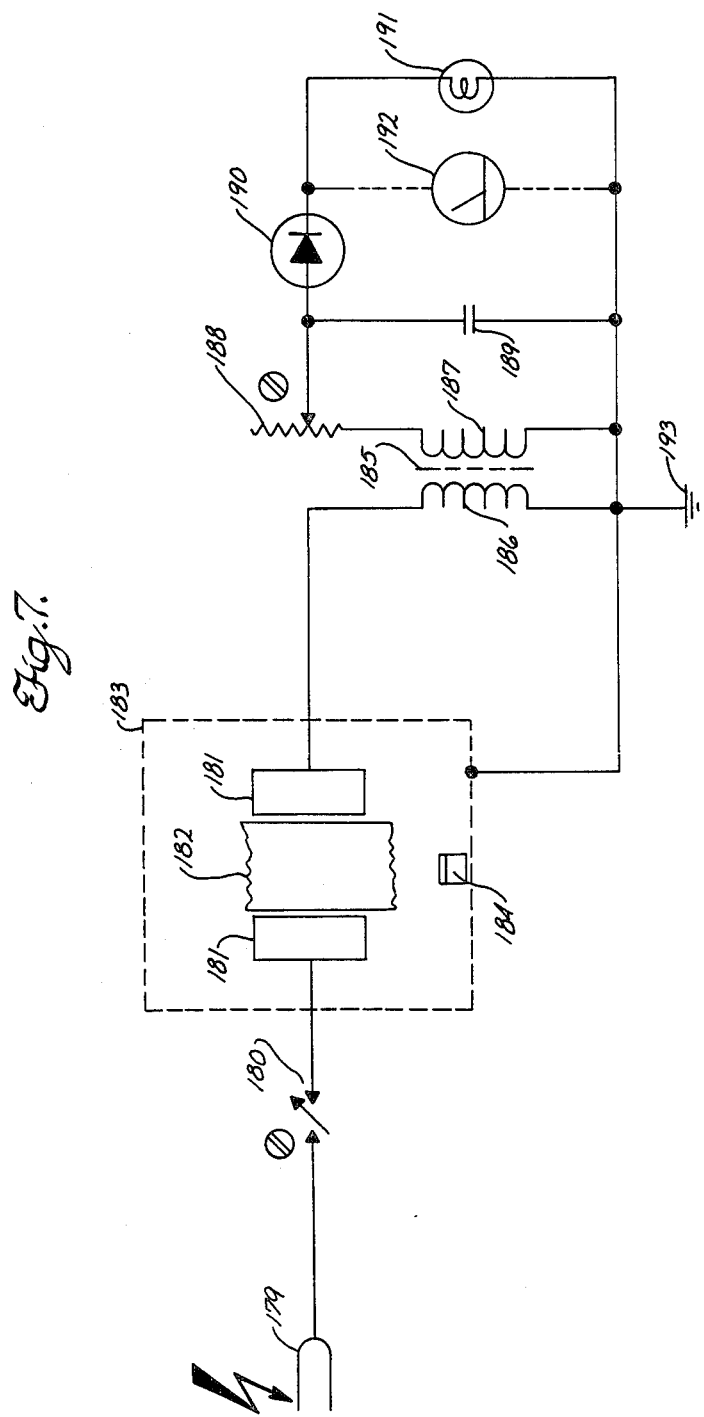
FIG. 7 is the schematic diagram of a dynamic conductance tester utilizing a calibrated wood specimen for setting proper power levels.

In FIG. 7 there is depicted the circuit of a dynamic conductance tester (a separate accessory) for testing the conductance of wood and kindred materials having a high dielectric constant and very high electrical resistance to assist the operator of a system according to the present invention in establishing the proper power levels for operating the system at each extermination job location having different conductive characteristics. High voltage radio frequency or multi-frequency energy, as developed and provided by the gun circuits of the present invention, is directly fed into input electrode 179. The energy jumps calibratable spark gap 180, enters and passes through dielectric test sample 182 via electrodes 181. The transmitted energy is then conducted through the primary winding 186 of transformer 185 to ground 193 and induces a voltage in secondary winding 187. This voltage is communicated to and attenuated by calibrated rheostat 188 and is thereafter communicated by smoothing capacitor 189 through diode 190 to a visual signal strength-indicating lamp 191 or a meter 192.

Sample-holding electrodes 181 may be spaced from sample 182 as the test site simulating situations require. A grounded Faraday shield 183 surrounds electrodes 181 and sample 182 while desired conductance enhancers, such as water vapors, may be fed into the faradic shield 183 via ducting through inlet 184 to further simulate the test site conditions.

In operation, the visual indicator 191 (an incandescent lamp) and/or a meter 192 provides readouts that are characteristic of the electrical parameters of sample 182. Energy return paths are provided via grounding point 193, also serving as a common bus.

What is claimed is:

1. An apparatus for applying electrical energy to termite-infested structures comprising:
   a portable housing;
   a source of electrical energy;
   electric current means connected to the energy source for generating high-voltage multifrequency electrical energy;
   an output electrode connected to the multifrequency generating means extending from the housing; and
   structure contacting means on the output electrode for establishing physical contact with the termite-infested structure to deliver high-voltage multifrequency energy by electrical conduction to said infested structure.

2. An apparatus according to claim 1 wherein the electric circuit means for generating the high-voltage multifrequency energy comprises a zero-reactance pulsing LC resonator operated by a mechanical switch energized by AC power.

3. An apparatus according to claim 1 including an output transformer connected between the generating means and the output electrode for stepping up the output voltage from the generating means.

4. An apparatus according to claim 3 wherein the output electrode and the output transformer are closely spaced to reduce energy losses therebetween to a minimum.

5. An apparatus according to claim 1 including means for controlling the output energy level.

6. An apparatus according to claim 1 including means for controlling the frequency spectrum of the high-voltage signal.

7. An apparatus according to claim 1 including means for monitoring the amount of power supplied by the apparatus to the structures.

8. An apparatus according to claim 7 wherein the monitoring means includes readout means.

9. An apparatus according to claim 7 wherein the readout means is an incandescent lamp.

10. An apparatus according to claim 7 wherein the readout means is a meter.

11. An apparatus according to claim 1 including testing means connected to the output electrode of the apparatus for determining the amount of power to be supplied by the apparatus to the termite infested structures.

12. An apparatus according to claim 11 wherein the testing means includes readout means.

13. An apparatus according to claim 12 wherein the readout means is an incandescent lamp.

14. An apparatus according to claim 12 wherein the readout means is a meter.

15. An apparatus according to claim 1 including a zero inductance cable interconnecting the high voltage multi-frequency electric energy generating means and the output electrode.

16. An apparatus according to claim 15 wherein the cable includes a plurality of parallel wires without any intertwining.

17. A method of controlling termite infestation comprising the step of physically applying and electrically contacting the area of infestation with a source of high-voltage multifrequency electric energy to cause electric currents to be electrically conducted into and through the area of termite infestation.

18. A method according to claim 17 including the step of enhancing the conductivity of the area of infestation prior to contacting the source of high-voltage energy to the structure.

19. A method according to claim 18 wherein the step of enhancing the conductivity of the area of infestation includes the step of applying a conductive fluid to an entry into said area.

20. A method according to claim 19 wherein the step of enhancing the conductivity of the infested area includes the step of inserting an electrode into the structure at the point of application of the electrical energy.

* * * * *